(12) United States Patent
Lee et al.

(10) Patent No.: US 7,372,801 B2
(45) Date of Patent: May 13, 2008

(54) REPRODUCTION-ONLY OPTICAL DISC AND METHOD OF RECORDING AND/OR REPRODUCING DATA ON AND/OR FROM THE SAME

(75) Inventors: Kyung-geun Lee, Gyeonggi-do (KR); Myong-do Ro, Gyeonggi-do (KR); In-sik Park, Gyeonggi-do (KR); Du-seop Yoon, Gyeonggi-do (KR); Chang-min Park, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 714 days.

(21) Appl. No.: 10/446,126

(22) Filed: May 28, 2003

(65) Prior Publication Data

US 2003/0223344 A1    Dec. 4, 2003

(30) Foreign Application Priority Data

Jun. 3, 2002    (KR) ............... 10-2002-0031172

(51) Int. Cl.
*G11B 7/00* (2006.01)
(52) U.S. Cl. ............... 369/275.4; 369/53.21
(58) Field of Classification Search ............. 369/275.4, 369/111
See application file for complete search history.

(56) References Cited

U.S. PATENT DOCUMENTS

| | | | | |
|---|---|---|---|---|
| 4,734,904 A | * | 3/1988 | Imanaka et al. | 369/109.02 |
| 5,633,840 A | * | 5/1997 | Han | 369/30.04 |
| 6,002,663 A | * | 12/1999 | Sandstrom | 369/282 |
| 6,115,353 A | * | 9/2000 | Horie et al. | 369/275.4 |
| 6,327,240 B1 | | 12/2001 | Tobita et al. | |
| 6,411,585 B1 | * | 6/2002 | Kobayashi | 369/112.01 |
| 6,650,615 B1 | * | 11/2003 | Yamamoto et al. | 369/275.1 |
| 6,667,952 B2 | * | 12/2003 | Komaki et al. | 369/275.5 |
| 6,898,172 B2 | * | 5/2005 | Fairman et al. | 369/275.3 |
| 6,906,994 B2 | | 6/2005 | Lee et al. | |
| 7,068,590 B2 | * | 6/2006 | Tsukuda et al. | 369/275.4 |

(Continued)

FOREIGN PATENT DOCUMENTS

CN    1203415    12/1998

(Continued)

OTHER PUBLICATIONS

Reference AA (US 6,327,240) is a U.S. counterpart of Reference AG (CN 1203415).

(Continued)

*Primary Examiner*—Wayne Young
*Assistant Examiner*—Van T. Pham
(74) *Attorney, Agent, or Firm*—Stein, McEwen & Bui, LLP

(57) ABSTRACT

A reproduction-only optical disc has a lead-in area, a user data area, and a lead-out area. Disc related information recorded on at least one of the lead-in area and the lead-out area is recorded by high frequency groove wobbles, and data of the user data area is recorded by pits. Since the high-density reproduction-only optical disc uses the same channels for reproduction signals as a high-density recordable optical disc, the two types of discs are consistent with each other and are compatible with the same disc drives.

27 Claims, 8 Drawing Sheets

U.S. PATENT DOCUMENTS

| | | | |
|---|---|---|---|
| 2001/0038603 A1* | 11/2001 | Kondo et al. | 369/275.2 |
| 2002/0021657 A1* | 2/2002 | Lee et al. | 369/275.4 |
| 2002/0114238 A1 | 8/2002 | Tosaki et al. | |
| 2003/0002427 A1 | 1/2003 | Lee et al. | |
| 2004/0013067 A1* | 1/2004 | Lee et al. | 369/53.22 |
| 2004/0114493 A1* | 6/2004 | Yamaguchi et al. | 369/111 |
| 2004/0184396 A1* | 9/2004 | Lee et al. | 369/275.3 |
| 2005/0099933 A1* | 5/2005 | Lee et al. | 369/275.3 |

FOREIGN PATENT DOCUMENTS

| | | |
|---|---|---|
| CN | 1327229 | 12/2001 |
| JP | 6-168449 | 6/1994 |
| JP | 7-334867 | 12/1995 |
| JP | 10-222874 | 8/1998 |
| JP | 2000-231722 | 8/2000 |

OTHER PUBLICATIONS

Reference AB (US 6,906,994) is a U.S. counterpart of Reference AH (CN 1327229).

* cited by examiner

REPRODUCTION-ONLY OPTICAL DISC AND METHOD OF RECORDING AND/OR REPRODUCING DATA ON AND/OR FROM THE SAME

CROSS-REFERENCE TO RELATED APPLICATION

This application claims the benefit of Korean Patent Application No. 2002-31172, filed on Jun. 3, 2002 in the Korean Intellectual Property Office, the disclosure of which is incorporated herein in its entirety by reference.

BACKGROUND OF THE INVENTION

1. Field of the Invention

The present invention relates to a high-density reproduction-only optical disc in which reproduction-only data is formed by groove wobbles and user data is formed by pits and reproduced through a different channel than the reproduction-only data, and a method of recording and/or reproducing data on the disc.

2. Description of the Related Art

Generally, optical discs are information recording media used with optical pickup devices which record/reproduce information in a non-contact manner with respect to the optical discs. Optical discs are generally classified as compact discs (CDs) or digital versatile discs (DVDs) according to their storage capacity. Examples of types of optical discs capable of recording, erasing, and/or reproducing information include 650MB CD recordable (CD-R), CD-rewritable (CD-RW), 4.7 GB DVD+RW, DVD plus random access memory (DVD+RAM), and DVD-RW. 650MB CD and 4.7GB DVD-ROM are examples of reproduction-only discs. Furthermore, high-density optical discs (such as HD-DVDs) having a recording capacity of 20GB or more, have been developed.

Generally, disc related information (i.e., reproduction-only data) is recorded as pits in a lead-in area positioned at an inner portion of a conventional reproduction-only optical disc. However, in order to design a reproduction-only optical disc that is compatible with the same disc drives as will be used with the to-be-developed high-density recordable optical disc, the formats of both discs must be consistent. Thus, a physical data structure of the high density reproduction-only optical disc must conform to the same standards as the high-density recordable optical disc.

SUMMARY OF THE INVENTION

The present invention provides a high-density reproduction-only optical disc with an improved physical data structure that has a good reproduction signal characteristic, a good jitter characteristic, and is consistent with the format of a high-density recordable optical disc and a method of recording or reproducing data on the high-density reproduction-only optical disc.

Additional aspects and advantages of the invention will be set forth in part in the description which follows and, in part, will be obvious from the description, or may be learned by practice of the invention.

According to an aspect of the present invention, a high-density, reproduction-only optical disc includes a lead-in area, a user data area, and a lead-out area, wherein disc related information is recorded as high frequency groove wobbles on at least one of the lead-in area and the lead-out area, and data is recorded as pits in the user data area.

According to other aspects of the invention, a depth of the groove wobbles is substantially the same as a depth of the pits or is substantially different from the depth of the pits.

According to a further aspect of the invention, when n represents a refractive index of the disc and $\lambda$ represents a wavelength of the reproduction beam, the depth of the pits ranges from $\lambda/12n$ to $\lambda/2n$ and the depth of the groove wobbles ranges from $\lambda/20n$ to $\lambda/5n$.

According to an additional aspect of the invention, the groove wobbles are reproduced through a difference signal channel, and the pits are reproduced through a sum signal channel.

According to another aspect of the present invention, a method of recording or reproducing data on a high-density reproduction-only optical disc having a lead-in area, a user data area, and a lead-out area includes recording disc related information as high frequency groove wobbles in at least one of the lead-in area and the lead-out area; and recording data as pits on the user data area.

BRIEF DESCRIPTION OF THE DRAWINGS

The above and/or other aspects and advantages of the present invention will become more apparent by describing in detail embodiments thereof with reference to the accompanying drawings in which: 1A through 1C schematically show a structure of a high-density recordable optical disc which is related to the present invention; 2A through 2C schematically show a structure of a high-density reproduction-only optical disc according to an aspect of the present invention.

DETAILED DESCRIPTION OF THE EMBODIMENTS

Figure 1A:
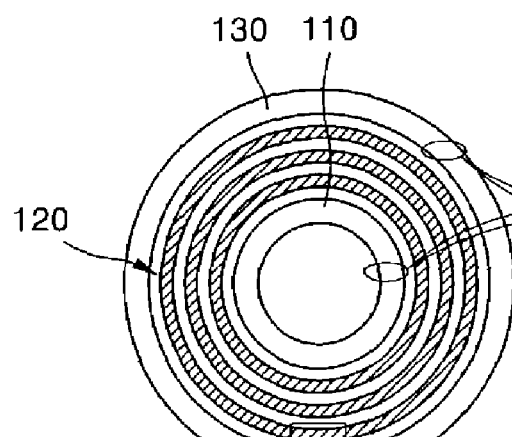
Figure 1B:
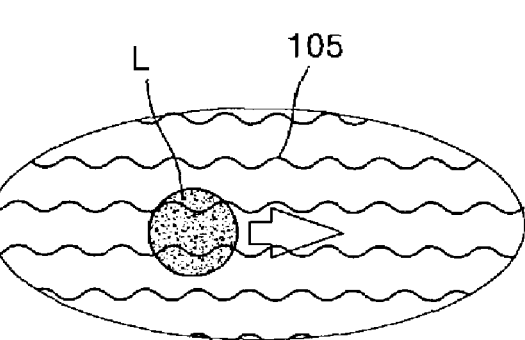
Figure 1C:
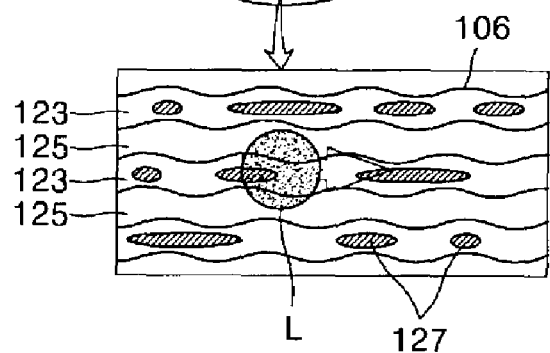

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A physical structure of a high-density recordable optical disc usable according to an aspect of the present invention is shown in 1A through 1C. The high-density recordable optical disc uses a format disclosed by three of the inventors of the present application in Korean Patent Application No. 2001-23747 and U.S. Pat. application Ser. No. 10/128,530 (published as U.S. Pat. Publication No. 2003-0002427A1), the disclosures of which are incorporated herein by reference. The high-density recordable optical disc includes a lead-in area 110, a user data area 120, and a lead-out area 130. The disc has groove tracks 123 and land tracks 125. Here, user data can be recorded only on the groove tracks 123, or on both the groove tracks 123 and the land tracks 125.

When reproduction-only data is recorded, wobble signals 105 and 106 which have waves having specific frequencies are successively recorded on both sidewalls of each of the groove tracks 123 and/or the land tracks 125 instead of pits. Here, the data is recorded or reproduced by a laser beam L travelling along the groove tracks 123 and/or the land tracks 125. Particularly, the lead-in area 110 and the lead-out area 130 include a reproduction-only area for recording disc related information and a recordable area, respectively. The disc related information is recorded by the high-frequency wobble signal 105. Further, in the recordable areas of the lead-in area 110 and the lead-out area 130, and in the user data area 120, data is recorded by the wobble signal 106 which has a lower frequency than the high-frequency wobble signal 105. Recording marks 127 are formed in the user data area 120.

Figure 7:
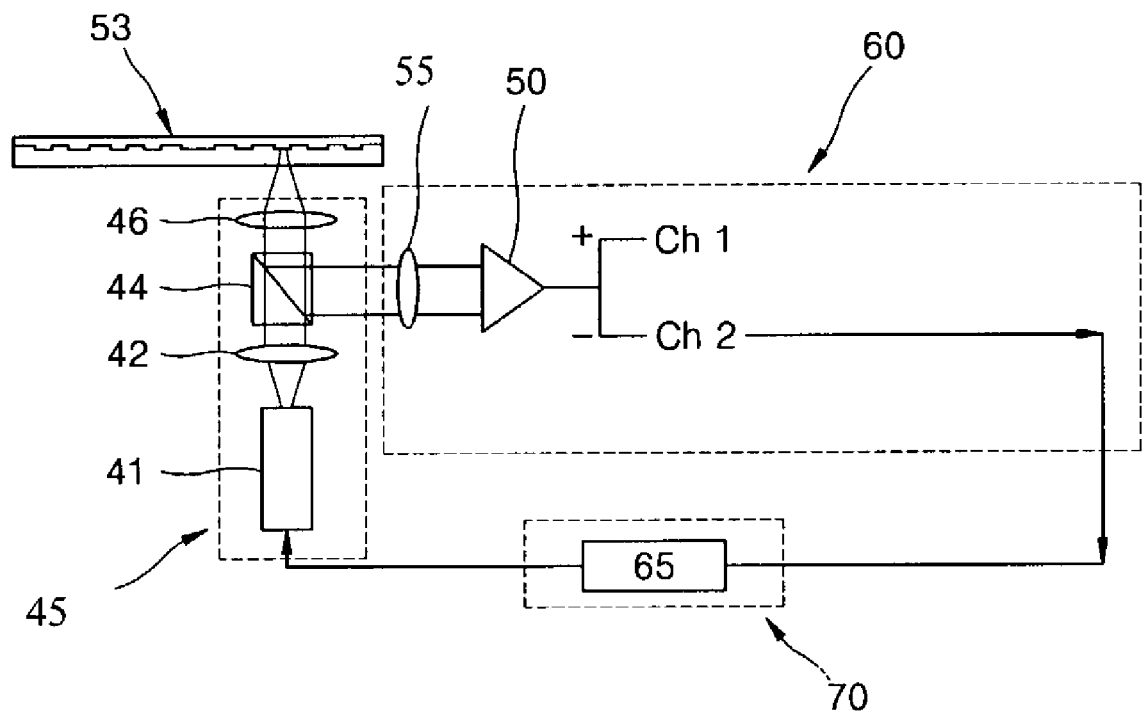
FIG. 7 is a view schematically showing a system for reproducing data from a high-density reproduction-only optical disc according to an aspect of the present invention.

The high-frequency wobble data is reproduced through a difference signal channel ch2 (refer to FIG. 7) using a push-pull signal, and data formed in the user data area 120 is reproduced through a sum signal channel ch1 (refer to FIG. 7).

Figure 2A:
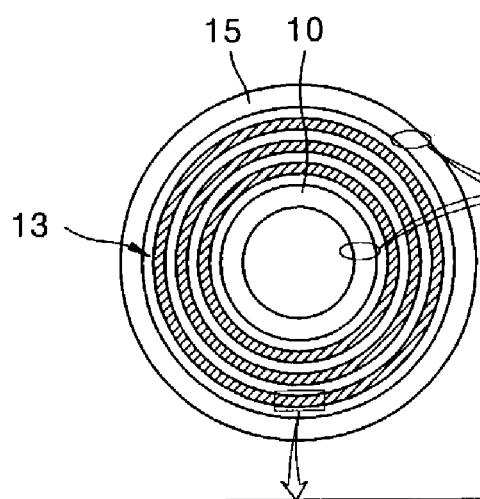
Figure 2B:
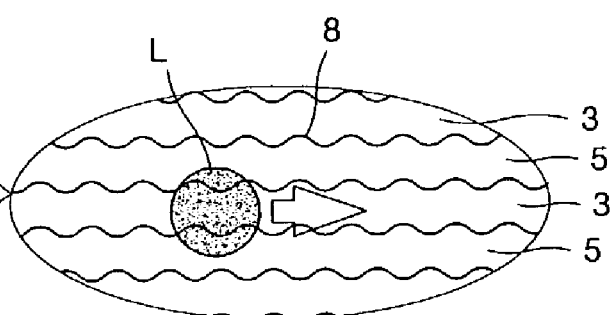
Figure 2C:
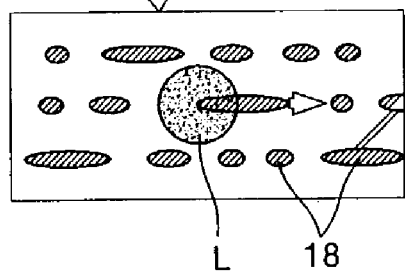

A physical data structure of a high-density reproduction-only optical disc according to the present invention is designed in consideration of the format of the high-density recordable optical disc as presented above. Referring to FIGS. 2A through 2C, a high-density reproduction-only optical disc according to the present invention includes a lead-in area 10, a user data area 13, and a lead-out area 15. Reproduction-only data such as disc related information is recorded on at least one of the lead-in area 10 and the lead-out area 15. Reproduction-only user data is recorded on the user data area 13. Groove tracks 3 and land tracks 5 are alternatively formed in the lead-in area 10 and the lead-out area 15. The reproduction-only data such as the disc related information is recorded by high frequency groove wobbles 8 formed as waves on both sidewalls of each of the groove tracks 3 and/or the land tracks 5. Further, user data is recorded in the form of pits 18 when the disc is manufactured. The disc shown in FIGS. 2A through 2C is a kind of hybrid disc, and has different reproduction channels for the reproduction-only data and the user data.

Figure 3:
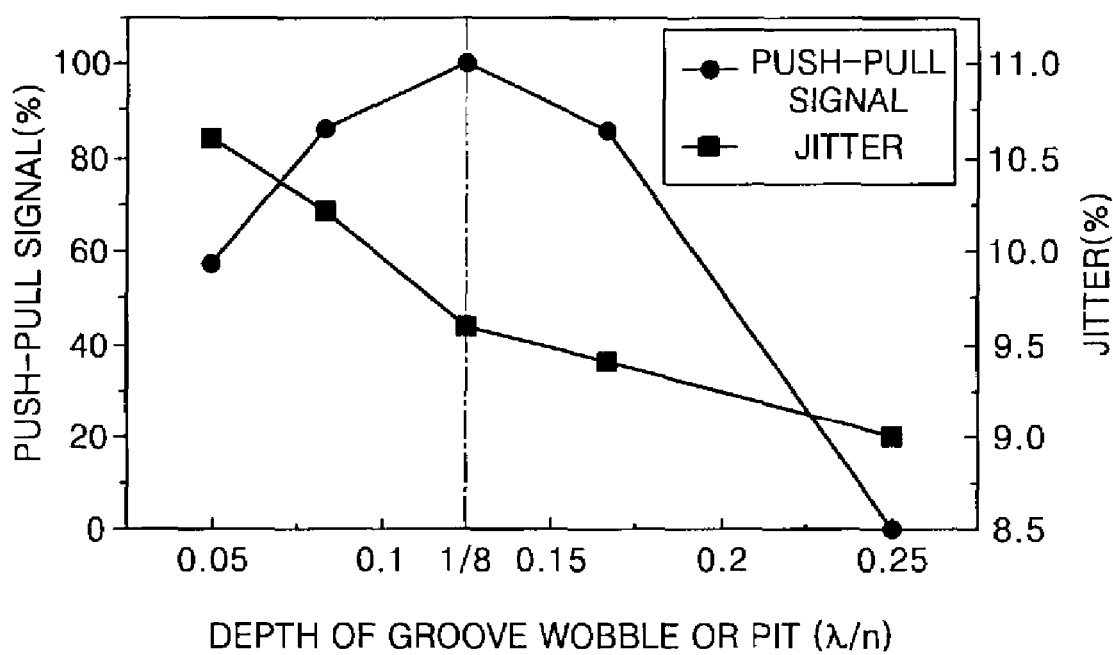
FIG. 3 is a graph illustrating changes in a push-pull signal and a jitter characteristic according to a depth of a groove; 4A through 4D are views illustrating processes for manufacturing a high-density reproduction-only optical disc according to an aspect of the present invention; 5 and 6 are perspective views of a portion of a high-density reproduction-only optical disc according to aspects of the present invention.

FIG. 3 shows a push-pull signal and a jitter characteristic according to the depth of the groove wobble or the depth of the pit. The depth of the groove wobble or the pit is determined such that the push-pull signal or the jitter characteristic is good. Here, the jitter characteristic is related to a sum signal. That is, the less the jitter value, the better the sum signal. When n represents a refractive index of the disc and λ represents a wavelength of a reproduction beam, the push-pull signal as shown in FIG. 3 indicates a maximum value at a depth of λ/8n, while the jitter value indicates a minimum value at a depth of λ/4n. Accordingly, the reproduction signal is at a maximum at a pit depth of λ/4n. In the graph of FIG. 3, the unit of the depth of the groove wobble or the pit is (λ/n).

The groove wobbles 8 having the same depth as the pits 18 can be formed in the high-density reproduction-only optical disc according to an embodiment of the present invention. The depth of the groove wobbles 8 or the pits 18 can be determined in consideration of the push-pull signal of the groove wobbles 8 and the jitter value of the pits 18 with reference to the graph of FIG. 3. For example, although both the push-pull signal and the jitter value are respectively slightly lower and higher than their respective maximum and minimum values when the groove wobbles 8 and the pits 18 are the same depth, the depth of the groove wobbles 8 and the pits 18 can be determined so as to obtain a reliable reproduction signal for both the push-pull signal and the jitter value. For example, where the depth of the groove wobbles 8 and the pits 18 are set to λ/6n, the push-pull signal is reduced by about 12% compared to its maximum value, and the jitter value of the pit signal is increased by about 0.4% compared to its minimum value. However, while not ideal, a reliable reproduction signal for both the push-pull signal and the jitter value can be obtained from the above values. Where the depths of the groove wobbles 8 and the pits 18 are the same as described in the above embodiment, a process for manufacturing the optical disc is significantly simplified.

In addition, the depth of the groove wobbles 8 or the pits 18 may be set to an optimum value for only one of the push-pull signal and the jitter value according to another embodiment. That is, the depths of the groove wobbles 8 and the pits 18 may be set to an optimum value for only the push-pull signal, for example, λ/8n, or to an optimum value for the jitter value, for example, λ/4n.

Further, the depth of the groove wobbles 8 may be different from that of the pits 18 according to a further embodiment. Here, the depth of the pits 18 ranges from λ/12n to λ/2n and the depth of the groove wobbles 8 ranges from λ/20n to λ/5n. Preferably, the depth of the groove wobbles 8 is set to an optimum value for the push-pull signal, for example, λ/8n, and the depth of the pits 18 is set to an optimum value for the jitter value, for example, λ/4n. Here, λ/8n and λ/4n are merely examples of optimum depths, and actual optimum depths of the groove wobbles 8 and the pits 18 may vary. Thus, where the depth of the groove wobbles 8 is different from that of the pits 18, the depths of the groove wobbles 8 and the pits 18 can be determined such that each of the signals corresponding to the groove wobbles 8 and the pits 18 have an optimum value.

The optical disc according to embodiments of the present invention can be a single-layer optical disc or a multi-layer optical disc having a plurality of information surfaces.

Figure 4A:
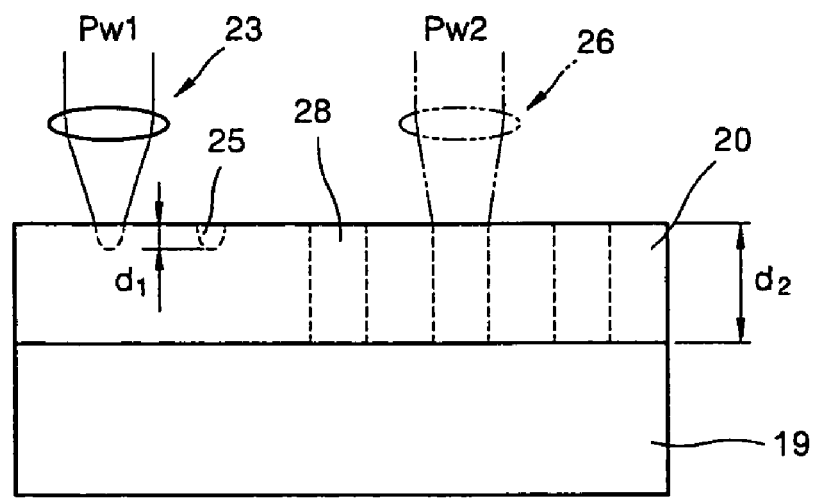

A method for manufacturing the optical disc according to an embodiment of the invention in which the depth of the groove wobbles 8 is different from that of the pits 18 will be described with reference to 4A through 4D. As shown in FIG. 4A, a photoresist 20 having the same depth d2 as the pits 18 is evenly applied on a master glass 19. Thereafter, the photoresist 20 is cut by a laser beam. Land areas 25 are cut to a depth d1 using a laser beam 23 having a power Pw1. Pit areas 28 are cut to the depth d2 using a laser beam 26 having a power Pw2. The power Pw2 is greater than the power Pw1. Since the present invention has stampers of even number and a substrate is molded using a stamper of the even number (such as a second stamper or a fourth stamper), tracks are formed during a first laser-cutting of the photoresist 20 in a spiral which spirals in a direction opposite to the direction in which the disc rotates during reproduction.

Figure 4B:
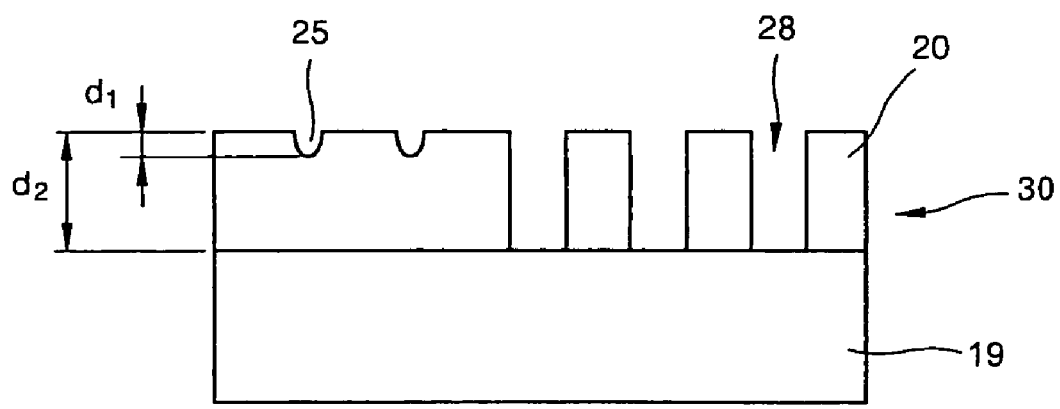
Figure 4C:
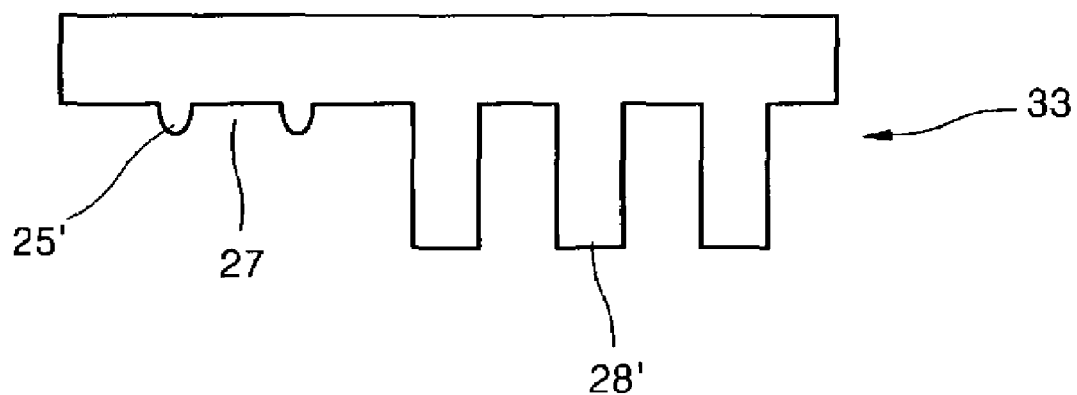

As shown in FIG. 4B, the laser-cut photoresist 20 is developed to form a master 30 in which the depth d2 of the pit areas 28 is greater than the depth d1 of the land areas 25. As shown in FIG. 4C, a father stamper 33 is stamped using the master 30. The shape of the father stamper 33 is opposite to that of the master 30 so that land areas 25' protrude, groove areas 27 between the protruding land areas 25' of the father stamper 33 are formed, and pit areas 28' protrude.

Figure 4D:
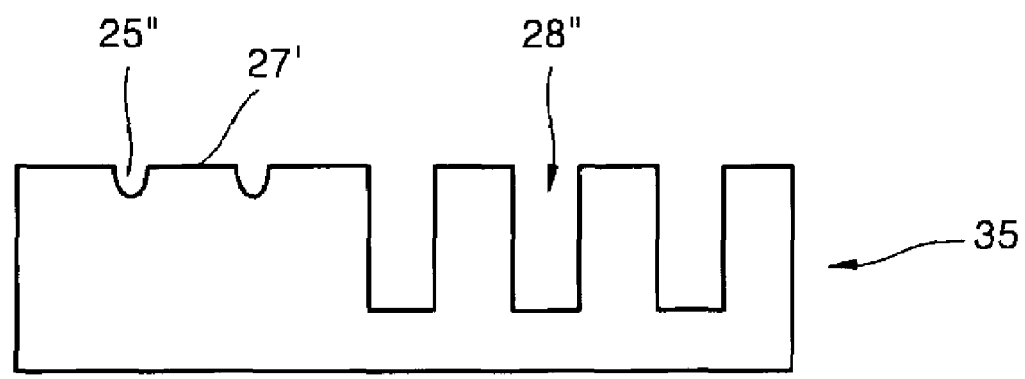

Next, as shown in FIG. 4D, a mother stamper 35 having an opposite shape of the father stamper 33 is stamped using the father stamper 33. The mother stamper 35 has land areas 25", pit areas 28", and groove areas 27' which are opposite in shape to the land areas 25', the pit areas 28', and the groove areas 27 of the father stamper 33, respectively. In order to mold a plurality of substrates using a stamper, a plurality of stampers are needed. If the plurality of stampers are manufactured using the master 30 having the photoresist 20 as described above, the master 30 is easily worn down due to the photoresist 20 so that the shape of the stampers manufactured using the master 30 is poor. Thus, a plurality of mother stampers 35 are stamped using the father stampers 33 in the present invention, and a plurality of substrates are injection-molded using the mother stampers 35.

Figure 5:
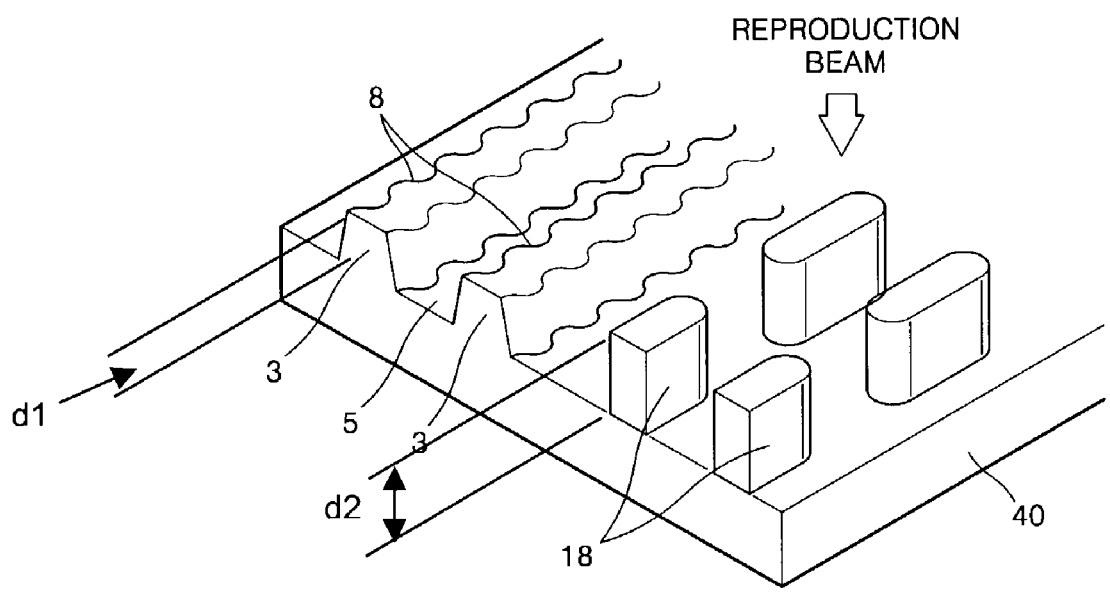

If a substrate 40 shown in FIG. 5 is manufactured using the father stamper 33 and the mother stamper 35 as described above, the shape of the manufactured substrate 40 is the same as that of the father stamper 33, and the shape of the mother stamper 35 is the same as that of the master 30. That is, the shape of the master 30 is opposite to that of the manufactured substrate 40. Thus, when using a mother stamper 35 to produce the disc, if the tracks are not formed in the spiral which spirals in the opposite direction during the first laser-cutting of the photoresist 20 as shown in FIG. 4A, the spiral direction of the formed tracks in the substrate 40 is opposite to the direction in which the disc must rotate.

Finally, the substrate 40 shown in FIG. 5 is molded using the mother stamper 35. Here, supposing that the depth of grooves 3 or groove wobbles 8 formed on the substrate 40 is denoted by d1 and the depth of pits 18 is denoted by d2 from the incident direction of the reproduction beam, the disc manufactured so that d1<d2 as shown in FIG. 5.

Figure 6:
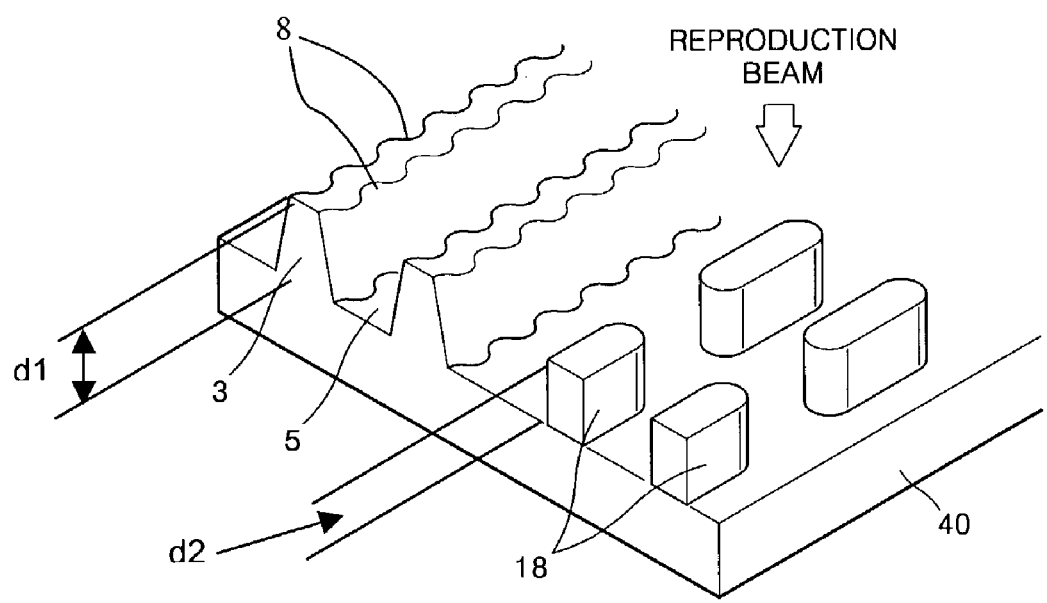
Figure 8:
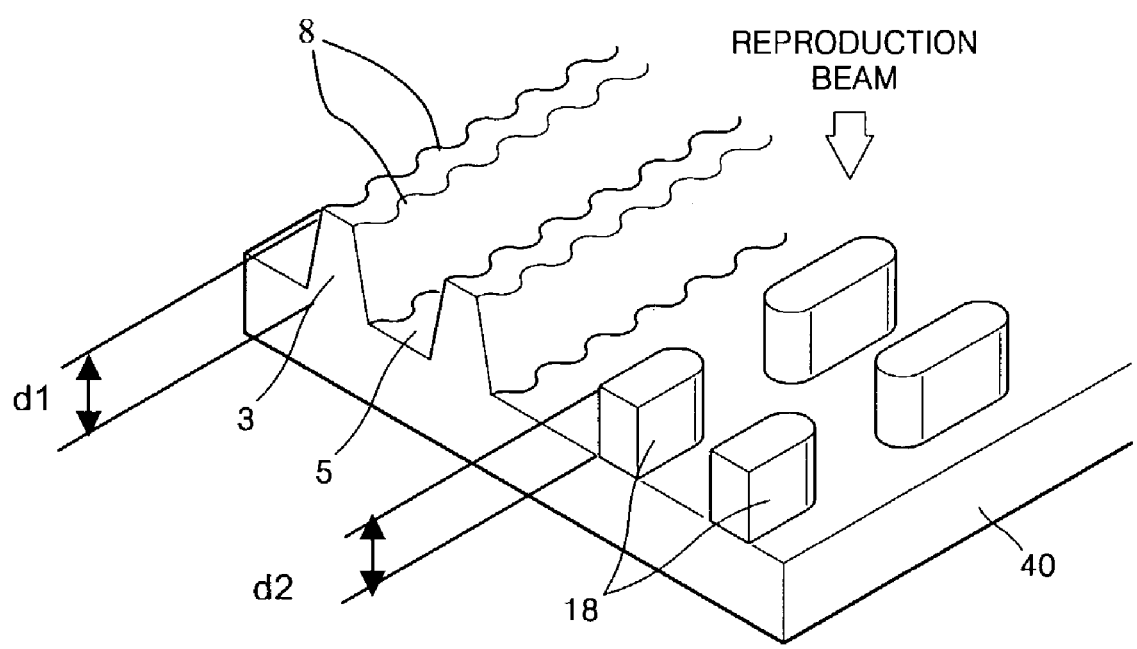
FIG. 8 is a perspective view of a portion of a high-density reproduction-only optical disc according to an aspect of the present invention.

Further, a disc as shown in FIG. 6 in which the groove wobbles 8 are deeper than the pits 18 (i.e., d1>d2) may be manufactured according to another embodiment of the invention by controlling the powers Pw1 and Pw2 of the laser beam. Also, a disc as shown in FIG. 8 in which the groove wobbles 8 have substantially the same depth as the pits 18 (i.e., d1=d2) may be manufactured according to another embodiment of the invention by controlling the powers Pw1 and Pw2 of the laser beam.

A method for recording/reproducing data on the high-density reproduction-only optical disc according to an embodiment of the present invention is as follows. Disc related information is recorded by the high frequency groove wobbles 8 on at least one of the lead-in area 10 and the lead-out area 15 shown in 2A and 2B. The data formed in the user data area 13 is recorded in the form of pits 18 as shown in FIG. 2C. Then, the data recorded by the groove wobbles 8 is reproduced through the difference signal channel ch2 using the push-pull signal as shown in FIG. 7, and the data recorded in the form of pits 18 is reproduced through the sum signal channel ch1 as shown in FIG. 7.

As described above, the groove wobbles 8 and the pits 18 may have the same depth, or may have different optimum depths.

FIG. 7 schematically shows an embodiment of a system for recording/reproducing data on the high-density reproduction-only optical disc according to the present invention. The system includes a pickup unit 45, a recorded/reproduced signal processing unit 60, and a control unit 70. More specifically, the recording/reproducing system further includes a laser diode 41 for radiating a laser beam, a collimating lens 42 for making the laser beam radiated from the laser diode 41 into a parallel laser beam, a beam splitter 44 for changing a proceeding path of incident light, and an objective lens 46 for focusing the laser beam passing though the beam splitter 44 on a disc 53.

The laser beam reflected from the disc 53 is reflected by the beam splitter 44 and is then received by a photodetector 55. An example of the photodetector 55 is a gradient photodetector 55, which divides an incident laser beam into four beam regions. The laser beam received by the photodetector 55 is converted into an electrical signal by an operation circuit unit 50 which outputs a sum signal to a sum signal channel ch1 for detecting an RF signal (i.e., a sum signal), and outputs a difference signal to a difference signal channel ch2 for detecting a wobble signal using a push-pull method. The pit data of the optical disc according to present invention is reproduced through the sum signal channel ch1, and the groove wobble data is reproduced through the difference signal channel ch2. Further, a tracking servo 65 of the control unit 70 can be embodied using the signal reproduced through the difference signal channel ch2.

As described above, since a high-density reproduction-only optical disc according to the present invention has a physical data structure that is designed in consideration of the format of a high-density recordable optical disc and channels for reproduction signals are the same in both discs, both discs are compatible with the same disc drives.

While the present invention has been particularly shown and described with reference to embodiments thereof, it will be understood by those of ordinary skill in the art that various changes in form and details may be made therein without departing from the spirit and scope of the present invention as defined by the accompanying claims and equivalents thereof.

What is claimed is:

1. A reproduction-only optical disc comprising:
   a lead-in area;
   a user data area;
   a lead-out area;
   disc related information recorded by groove wobbles in the lead-in area and/or the lead-out area of the reproduction-only optical disc; and
   data recorded by pits in the user data area of the reproduction-only optical disc;
   wherein:
   an area of the reproduction-only optical disc in which the disc related information is recorded does not have pits,
   a depth of the groove wobbles is a depth that optimizes a difference signal obtained by reproducing the disc related information through a difference signal channel, and
   a depth of the pits is a depth that optimizes a sum signal obtained by reproducing the data through a sum signal channel.

2. The reproduction-only optical disc of claim 1, wherein the depth of the groove wobbles is substantially the same as the depth of the pits.

3. The reproduction-only optical disc of claim 1, wherein the depth of the groove wobbles is substantially different from the depth of the pits.

4. The reproduction-only optical disc of claim 3, wherein:
   n represents a refractive index of the reproduction-only optical disc, $\lambda$ represents a wavelength of a reproducing beam usable to reproduce the disc related information and the data,
   the depth of the pits is in a range of $\lambda/12n$ to $\lambda/2n$, and
   the depth of the groove wobbles is in a range of $\lambda/20n$ to $\lambda/5n$.

5. The reproduction-only optical disc of claim 4, further comprising one or more layers each having respective ones of the lead-in area, the user data area, the lead-out area, the disc related information, and the data.

6. The reproduction-only optical disc of claim 1, further comprising one or more layers each having respective ones of the lead-in area, the user data area, the lead-out area, the disc related information, and the data.

7. The reproduction-only optical disc of claim 1, wherein the disc related information and/or the data is recorded on the reproduction-only optical disc using a stamper.

8. The reproduction-only optical disc of claim 7, wherein the reproduction-only optical disc has a recording capacity of 20 gigabytes or more.

9. The reproduction-only optical disc of claim 7, wherein the groove wobbles and the pits of the reproduction-only optical disc are reproducible by an optical disc drive also capable of recording and/or reproducing a recordable optical disc having a recording capacity of 20 gigabytes or more.

10. The reproduction-only optical disc of claim 9, wherein the reproduction-only optical disc has a recording capacity of 20 gigabytes or more.

11. A method of recording data on a reproduction-only optical disc having a lead-in area, a user data area, and a lead-out area, the method comprising:
    recording disc related information using groove wobbles in the lead-in area and/or the lead-out area of reproduction-only optical disc; and
    recording data using pits in the user data area of the reproduction-only optical disc;
    wherein:
    an area of the reproduction-only optical disc in which the disc related information is recorded does not have pits,
    a depth of the groove wobbles is a depth that optimizes a difference signal obtained by reproducing the disc related information through a difference signal channel, and
    a depth of the pits is a depth that optimizes a sum signal obtained by reproducing the data through a sum signal channel.

12. The method of claim 11, wherein the depth of the groove wobbles is substantially the same as the depth of the pits.

13. The method of claim 11, wherein the depth of the groove wobbles is substantially different from the depth of the pits.

14. The method of claim 13, wherein:
    n represents a refractive index of the reproduction-only optical disc, $\lambda$ represents a wavelength of a reproducing beam usable to reproduce the disc related information and the data,
    the depth of the pits is in a range of $\lambda/12n$ to $\lambda/2n$, and
    the depth of the groove wobbles is in a range of $\lambda/20n$ to $\lambda/5n$.

15. The method of claim 11, wherein the reproduction-only optical disc further comprises one or more layers each having respective ones of the lead-in area, the user data area, the lead-out area, the disc related information, and the data.

16. The method of claim 11, wherein the recording of the disc related information and/or the recording of the data is performed using a stamper.

17. The method of claim 16, wherein the reproduction-only optical disc has a recording capacity of 20 gigabytes or more.

18. The method of claim 16, wherein the groove wobbles and the pits of the reproduction-only optical disc are reproducible by an optical disc drive also capable of recording and/or reproducing a recordable optical disc having a recording capacity of 20 gigabytes or more.

19. The method of claim 18, wherein the reproduction-only optical disc has a recording capacity of 20 gigabytes or more.

20. A optical disc comprising:
    a lead-in area;
    a user data area; and
    a lead-out area;
    wherein:
    disc related information is recorded as groove wobbles in the lead-in area and/or the lead-out area of the optical disc,
    data is recorded as pits in the user data area of the optical disc, and
    a capacity of the optical disc is 20 gigabytes or more;
    wherein:
    an area of the optical disc in which the disc related information is recorded does not have pits,
    a depth of the groove wobbles is a depth that optimizes a difference signal obtained by reproducing the disc related information through a difference signal channel, and
    a depth of the pits is a depth that optimizes a sum signal obtained by reproducing the data through a sum signal channel.

21. The optical disc of claim 20, wherein;
    the optical disc is a reproduction-only optical disc, and
    a format of the reproduction-only optical disc is sufficiently the same as a format of a recordable optical disc to enable recording and/or reproducing of the reproduction-only optical disc and the recordable optical disc by a same optical disc drive.

22. The optical disc of claim 20, wherein the depth of the groove wobbles is substantially the same as the depth of the pits.

23. The optical disc of claim 20, wherein the depth of the groove wobbles is substantially different from the depth of the pits.

24. The disc of claim 23, wherein:
    n represents a refractive index of the optical disc,
    $\lambda$ represents a wavelength of a reproduction beam usable to reproduce the disc related information and the data,
    the depth of the pits is in a range of $\lambda/12n$ to $\lambda/2n$, and
    the depth of the groove wobbles is in a range of $\lambda/20n$ to $\lambda/5n$.

25. A recording and/or reproducing apparatus to record and/or reproduce a recordable optical disc and a reproduction-only optical disc having a common format for disc related information and data, the recording and/or reproducing apparatus comprising:
    a pickup unit to record and/or reproduce the disc related information and the data on and/or from the recordable optical disc and the reproduction-only optical disc;
    a signal processing unit to process a signal received from the pickup unit; and
    a controller to control the pickup unit to record and/or reproduce the disc related information and the data on and/or from the recordable optical disc and the reproduction-only optical disc based on a signal received from the signal processing unit;
    wherein:
    the recording and/or reproducing apparatus is compatible with both the recordable optical disc and the reproduction-only optical disc,
    each of the recordable optical disc and the reproduction-only optical disc comprises a lead-in area, a user data area, and a lead-out area,
    the disc related information is recorded as groove wobbles in the lead-in area and/or the lead-out area,
    the data is recorded as pits in the user data area,
    each of the recordable optical disc and the reproduction-only optical disc has a capacity of 20 gigabytes or more, an area of each of the recordable optical disc and the reproduction-only optical disc in which the disc related information is recorded does not have pits, the pickup unit includes a light source to emit a beam having a wavelength, the signal processing unit outputs a difference signal obtained from the disc related information, and a sum signal obtained from the data, the sum signal being related to jitter, a depth of the groove wobbles is substantially different from a depth of the pits, the depth of the groove wobbles is a depth that depends on the wavelength of the beam and optimizes a level of the difference signal relative to a level of the jitter, and the depth of the pits is a depth that depends on the wavelength of the beam and optimizes the level of the jitter relative to the level of the difference signal.

26. The recording and/or reproducing apparatus of claim 25, wherein the reproduction-only optical disc is manufactured using a stamper and has a format sufficiently the same as a format of the recordable optical disc to enable recording and/or reproducing of the recordable optical disc and the reproduction-only optical disc by the recording and/or reproducing apparatus.

27. The recording and/or reproducing apparatus of claim 25, wherein:

n represents a refractive index of the disc, $\lambda$ represents the wavelength of the beam, the depth of the pits is in a range of $\lambda/12n$ to $\lambda/2n$, and the depth of the groove wobbles is in a range of $\lambda/20n$ to $\lambda/5n$.

* * * * *